(12) United States Patent
Coffy et al.

(10) Patent No.: US 8,278,403 B2
(45) Date of Patent: Oct. 2, 2012

(54) MULTI-COMPONENT CATALYST SYSTEMS AND POLYMERIZATION PROCESSES FOR FORMING BROAD COMPOSITION DISTRIBUTION POLYMERS

(75) Inventors: Tim Coffy, Houston, TX (US); Kenneth Blackmon, Houston, TX (US); Joseph Thorman, Houston, TX (US); David Rauscher, Angleton, TX (US); Jun Tian, League City, TX (US); William Gauthier, Houston, TX (US); Nathan Williams, Webster, TX (US)

(73) Assignee: Fina Technology, Inc., Houston, TX (US)

( * ) Notice: Subject to any disclaimer, the term of this patent is extended or adjusted under 35 U.S.C. 154(b) by 121 days.

(21) Appl. No.: 12/832,237

(22) Filed: Jul. 8, 2010

(65) Prior Publication Data

US 2012/0010376 A1 Jan. 12, 2012

(51) Int. Cl.
*C08F 4/60* (2006.01)
*C08F 4/603* (2006.01)
*C08F 4/606* (2006.01)
*C08F 4/6592* (2006.01)
*C08L 23/00* (2006.01)
*B01J 31/22* (2006.01)

(52) U.S. Cl. ........ 526/113; 526/114; 526/160; 526/165; 526/348; 526/943; 525/240; 502/113; 502/152

(58) Field of Classification Search .................. 526/113, 526/114, 160, 165, 348, 943; 525/240; 502/113, 502/152
See application file for complete search history.

(56) References Cited

U.S. PATENT DOCUMENTS

| 7,026,040 B2* | 4/2006 | Mehta et al. ................. 428/212 |
| 2003/0194575 A1 | 10/2003 | Tau et al. |
| 2003/0197304 A1 | 10/2003 | Cooper et al. |
| 2004/0220359 A1 | 11/2004 | Abhari et al. |
| 2005/0032983 A1 | 2/2005 | Mehta et al. |

* cited by examiner

*Primary Examiner* — Caixia Lu

(57) ABSTRACT

Propylene polymerization processes, polymers and films formed therefrom are described herein. The propylene polymerization processes generally include contacting propylene and an amount of ethylene with a first metallocene catalyst and a second metallocene catalyst within a polymerization reaction vessel to form a propylene based polymer, wherein the amount is an amount effective to form the propylene based polymer including from about 2 wt. % to about 6 wt. % ethylene, the second metallocene catalyst is capable of incorporating a greater amount of ethylene into the propylene based polymer than the first metallocene catalyst and wherein the first metallocene catalyst is capable of forming a propylene/ethylene random copolymer exhibiting a melting temperature that is greater than that of a propylene/ethylene random copolymer formed from the second metallocene catalyst.

17 Claims, 5 Drawing Sheets

MULTI-COMPONENT CATALYST SYSTEMS AND POLYMERIZATION PROCESSES FOR FORMING BROAD COMPOSITION DISTRIBUTION POLYMERS

FIELD

Embodiments of the present invention generally relate to processes and catalyst systems for forming polyolefins. In particular, embodiments relate to multi-component catalyst systems for forming polyolefins exhibiting broad composition distributions.

BACKGROUND

As reflected in the patent literature, film applications require polymer resins having a balance of physical properties and mechanical processability that is difficult to realize in practice. Generally, a resin having a desirably high melting point will, not exhibit a desirably low seal initiation temperature.

Therefore, a need exists to develop polymer resins having a desirable balance of physical and processability requirements for film applications.

SUMMARY

Embodiments of the present invention include propylene polymerization processes. The propylene polymerization processes generally include contacting propylene and an amount of ethylene with a first metallocene catalyst and a second metallocene catalyst within a polymerization reaction vessel to form a propylene based polymer, wherein the amount is an amount effective to form the propylene based polymer including from about 2 wt. % to about 0.6 wt. % ethylene, the second metallocene catalyst is capable of incorporating a greater amount of ethylene into the propylene based polymer than the first metallocene catalyst and wherein the first metallocene catalyst is capable of forming a propylene/ethylene random copolymer exhibiting a melting temperature that is greater than that of a propylene/ethylene random copolymer formed from the second metallocene catalyst.

One or more embodiments include a propylene based polymer formed by the process of the preceding paragraph.

One or more embodiments include the process of paragraph 0004, wherein the propylene based polymer exhibits a melt flow rate of from about 0.1 dg/min. to about 20 dg./min.

One or more embodiments include the process of any preceding paragraph, wherein the propylene based polymer is capable of forming a film exhibiting a seal initiation temperature that is lower than a melting temperature of the propylene based polymer.

One or more embodiments include the process of paragraph 0007, wherein the seal initiation temperature is less than about 110° C.

One or more embodiments include the process of any preceding paragraph, wherein the first metallocene catalyst and the second metallocene catalyst are supported on the same support material.

One or more embodiments include the process of any preceding paragraph, wherein the first metallocene catalyst is supported on a first support material and the second metallocene catalyst is supported on a second support material.

One or more embodiments include the process of any preceding paragraph, wherein the first metallocene catalyst contacts the second metallocene catalyst prior to introduction into the polymerization reaction vessel.

One or more embodiments include the process of any preceding paragraph, wherein the first metallocene catalyst and the second metallocene catalyst first contact one another within the polymerization reaction vessel.

One or more embodiments include the process of any preceding paragraph, wherein the first metallocene catalyst is represented by the general formula:

wherein X is a structural bridge between Ind, Ind is an indenyl group, $R^1$ is a substituent on the $2^{nd}$ position and is an alkyl, $R^2$ is a substituent on the $4^{th}$ position and is a phenyl, M is a transition metal and A is an alkyl, hydrocarbyl or halogen group.

One or more embodiments include the process of any preceding paragraph, wherein the second metallocene catalyst is represented by the general formula:

wherein X is a structural bridge between Ind, Ind is an indenyl group, $R^1$ is a substituent on the $2^{nd}$ position and is an alkyl, $R^2$ is a benzo group at the 4,5 position, M is a transition metal and A is an alkyl, hydrocarbyl or halogen group.

One or more embodiments include the process of any preceding paragraph, wherein the first metallocene catalyst comprises dimethylsilylbis(2-methyl-4-phenyl-indenyl)zirconium dichloride.

One or more embodiments include the process of any preceding paragraph, wherein the second metallocene catalyst comprises dimethylsilylbis(2-methyl-4,5-benzo-indenyl)zirconium dichloride.

One or more embodiments include the process of any preceding paragraph, wherein the second metallocene catalyst is represented by the general formula:

wherein X is a structural bridge between Fl and Cp, Fl is a fluorenyl group, Cp is a cyclopentadienyl group, M is a transition metal and A is an alkyl, hydrocarbyl or halogen group.

One or more embodiments include the process of any preceding paragraph, wherein the second metallocene catalyst comprises diphenylmethylene(2,7-di-tert-butyl-fluorenyl)(2-methyl-4-tert-butyl-cyclopentadienyl)zirconium dichloride.

One or more embodiments include the process of any preceding paragraph, wherein the second metallocene catalyst comprises dimethylmethylene(fluorenyl)(2-methyl-4-tert-butyl-cyclopentadienyl)zirconium dichloride.

One or more embodiments include the process of any preceding paragraph, wherein the first metallocene catalyst contacts the second metallocene catalyst in substantially equal amounts.

One or more embodiments include the process of any preceding paragraph, wherein the first metallocene catalyst contacts the second metallocene catalyst in a weight ratio of from about 10:1 to about 1:10.

One or more embodiments include the process of any preceding paragraph, wherein the first metallocene catalyst contacts the second metallocene catalyst in a weight ratio of from about 5:1 to about 1:5.

One or more embodiments include films formed from the polymer of paragraph 0005.

One or more embodiments include the film of paragraph 0023, wherein the film exhibits a seal initiation temperature of less than about 110° C.

One or more embodiments include the film of any preceding paragraph, wherein the film is oriented.

One or more embodiments include the process of any preceding paragraph, wherein the process exhibits an increased catalyst activity compared to an identical process absent the first metallocene catalyst.

DETAILED DESCRIPTION

Introduction and Definitions

Figure 1:
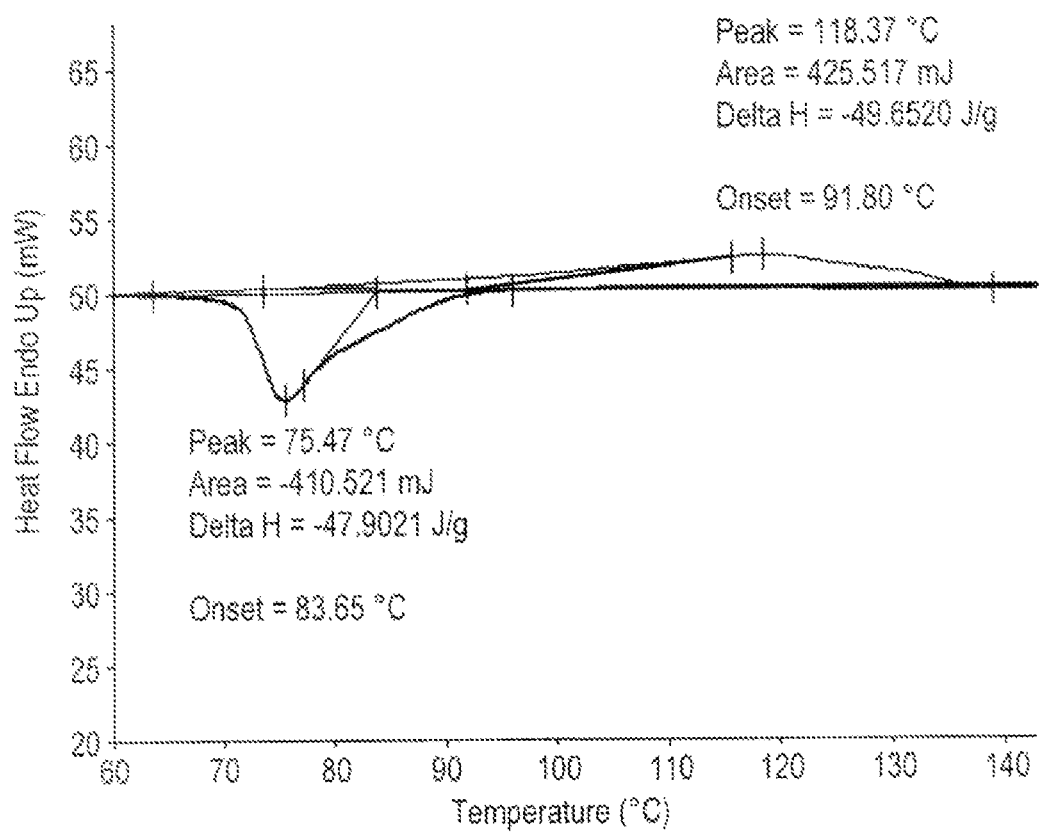
FIG. 1 illustrates a DSC trace of polymer samples.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter, recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Certain polymerization processes disclosed herein involve contacting olefin monomers with a multi-component catalyst composition, sometimes also referred to herein as simply a multi-component catalyst. As used herein, the terms "multi-component catalyst composition" and "multi-component catalyst" refer to any composition, mixture or system that includes at least two different catalyst compounds. Although it is contemplated that the multi-component catalyst can include more than two different catalysts, for purposes of discussing the invention herein, only two of those catalyst compounds are described in detail herein (i.e., the "first catalyst component" and the "second catalyst component").

The multi-component catalyst compositions described herein include a "first catalyst component" and a "second catalyst component". The first catalyst component and the second catalyst component are generally selected from metallocene catalysts. A brief discussion of such catalysts is included below, but is in no way intended to limit the scope of the invention to such catalysts.

Metallocene catalysts may be characterized generally as coordination compounds incorporating one or more cyclopentadienyl (Cp) groups (which may be substituted or unsubstituted, each substitution being the same or different) coordinated with a transition metal through π bonding.

The substituent groups on Cp may be linear, branched or cyclic hydrocarbyl radicals, for example. The inclusion of cyclic hydrocarbyl radicals may transform the Cp into other contiguous ring structures, such as indenyl, azulenyl and fluorenyl groups, for example. These contiguous ring structures may also be substituted or, unsubstituted by hydrocarbyl radicals, such as $C_1$ to $C_{20}$ hydrocarbyl radicals, for, example.

A specific, non-limiting, example of a metallocene catalyst is a bulky ligand metallocene compound generally represented by the formula:

wherein L is a bulky ligand, A is a leaving group, M is a transition metal and m and n are such that the total ligand valency corresponds to the transition metal valency. For example m may be from 1 to 4 and n may be from 1 to 3.

The metal atom "M" of the metallocene catalyst compound, as described throughout the specification and claims, may be selected from Groups 3 through 12 atoms and lanthanide Group atoms, or from Groups 3 through 10 atoms or from Sc, Ti, Zr, Hf, V, Nb, Ta, Mn, Re, Fe, Ru, Os, Co, Rh, Ir and Ni. The oxidation state of the metal atom "M" may range from 0 to +7 or is +1, +2, +3, +4 or +5, for example.

The bulky ligand generally includes a cyclopentadienyl group (Cp) or a derivative thereof. The Cp ligand(s) form at least one chemical bond with the metal atom M to form the "metallocene catalyst." The Cp ligands are distinct from the leaving groups bound to the catalyst compound in that they are not highly susceptible to substitution/abstraction reactions.

Cp ligands may include ring(s) or ring system(s) including atoms selected from group 13 to 16 atoms, such as carbon, nitrogen, oxygen, silicon, sulfur, phosphorous, germanium, boron, aluminum and combinations thereof, wherein carbon makes up at least 50% of the ring members. Non-limiting examples of the ring or ring systems include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl or "$H_4Ind$"), substituted versions thereof and heterocyclic versions thereof, for example.

Cp substituent groups may include hydrogen radicals, alkyls (e.g., methyl, ethyl, propyl, butyl, pentyl, hexyl, fluoromethyl, fluoroethyl, difluoroethyl, iodopropyl, bromohexyl, benzyl, phenyl, methylphenyl, tert-butylphenyl, chlorobenzyl, dimethylphosphine and methylphenylphosphine), alkenyls (e.g., 3-butenyl, 2-propenyl and 5-hexenyl), alkynyls, cycloalkyls (e.g., cyclopentyl and cyclohexyl), aryls (e.g., trimethylsilyl, trimethylgermyl, methyldiethylsilyl, acyls, aroyls, tris(trifluoromethyl)silyl, methylbis(difluoromethyl)silyl and bromomethyldimethylgermyl), alkoxys (e.g., methoxy, ethoxy, propoxy and phenoxy), aryloxys, alkylthiols, dialkylamines (e.g., dimethylamine and diphenylamine), alkylamidos, alkoxycarbonyls, aryloxycarbonyls, carbomoyls, alkyl- and dialkyl-carbamoyls, acyloxys, acylaminos, aroylaminos, organometalloid radicals (e.g., dimethylboron), Group 15 and Group 16 radicals (e.g., methylsulfide and ethylsulfide) and combinations thereof, for example. In one embodiment, at least two substituent groups, two adjacent substituent groups in one embodiment, are joined to form a ring structure.

Each leaving group "A" is independently selected and may include any ionic leaving group, such as halogens (e.g., chloride and fluoride), hydrides, $C_1$ to $C_{12}$ alkyls (e.g., methyl, ethyl, propyl, phenyl, isobutyl, cyclobutyl, hexyl, cyclohexyl, heptyl, tolyl, octyl, trifluoromethyl, methylphenyl, dimethylphenyl and trimethylphenyl), $C_2$ to $C_{12}$ alkenyls (e.g., $C_2$ to $C_6$ fluoroalkenyls), $C_6$ to $C_{12}$ aryls (e.g., $C_7$ to $C_{20}$ alkylaryls), $C_1$ to $C_{12}$ alkoxys (e.g., phenoxy, methoxy, ethoxy, propoxy and benzoxy), $C_6$ to $C_{16}$ aryloxys, $C_7$ to $C_{18}$ alkylaryloxys and $C_1$ to $C_{12}$ heteroatom-containing hydrocarbons and substituted derivatives thereof, for example.

Other non-limiting examples of leaving groups include amines, phosphines, ethers, carboxylates (e.g., $C_1$ to $C_6$ alkylcarboxylates, $C_6$ to $C_{12}$ arylcarboxylates and $C_7$ to $C_{18}$ alkylarylcarboxylates), dienes, alkenes (e.g., tetramethylene, pentamethylene, methylidene), hydrocarbon radicals having from 1 to 20 carbon atoms (e.g., pentafluorophenyl) and combinations thereof, for example. In one embodiment, two or more leaving groups form a part of a fused ring or ring system.

In a specific embodiment, L and A may be bridged to one another to form a bridged metallocene catalyst. A bridged metallocene catalyst, for example, may be described by the general formula:

wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups "X" include divalent hydrocarbon groups containing at least one Group 13 to 16 atom, such as, but not limited to, at least one of a carbon, oxygen, nitrogen, silicon, aluminum, boron, germanium, tin and combinations thereof; wherein the heteroatom may also be a $C_1$ to $C_{12}$ alkyl or aryl group substituted to satisfy a neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $-Si(R)_2Si(R_2)-$, $R_2Ge=$ or $RP=$ (wherein "=" represents two chemical bonds), where R is independently selected from hydrides, hydrocarbyls, halocarbyls, hydrocarbyl-substituted organometalloids, halocarbyl-substituted organometalloids, disubstituted boron atoms, disubstituted Group 15 atoms, substituted Group 16 atoms and halogen radicals, for example. In one embodiment, the bridged metallocene catalyst component has two or more bridging groups.

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butypsilyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl.

In another embodiment, the bridging group may also be cyclic and include 0.4 to 10 ring members or 5 to 7 ring members, for example. The ring members may be selected from the elements mentioned above and/or from one or more of boron, carbon, silicon, germanium, nitrogen and oxygen, for example. Non-limiting examples of ring structures which may be present as or part of the bridging moiety are cyclobutylidene, cyclopentylidene, cyclohexylidene, cycloheptylidene, cyclooctylidene, for example. The cyclic bridging groups may be saturated or unsaturated and/or carry one or more substituents and/or be fused to one or more other ring structures. The one or more Cp groups which the above cyclic bridging moieties may optionally be fused to may be saturated or unsaturated. Moreover, these ring structures may themselves be fused, such as, for example, in the case of a naphthyl group.

In one embodiment, the metallocene catalyst includes CpFlu Type catalysts (e.g., a metallocene catalyst wherein the ligand includes a Cp fluorenyl ligand structure) represented by the following formula:

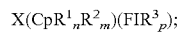

wherein Cp is a cyclopentadienyl group or derivatives thereof, Fl is a fluorenyl group, X is a structural bridge between Cp and Fl, $R^1$ is an optional substituent on the Cp, n is 1 or 2, $R^2$ is an optional substituent on the Cp bound to a carbon immediately adjacent to the ipso carbon, m is 1 or 2 and each $R^3$ is optional, may be the same or different and may be selected from C1 to C20 hydrocarbyls. In one embodiment, at least one $R^3$ is substituted in the para position on the fluorenyl group and at least one other $R^3$ being substituted at an opposed para position on the fluorenyl group and p is 2 or 4.

In yet another aspect, the metallocene catalyst includes bridged mono-ligand metallocene compounds (e.g., mono cyclopentadienyl catalyst components). In this embodiment, the metallocene catalyst is a bridged "half-sandwich" metallocene catalyst. In yet another aspect of the invention, the at least one metallocene catalyst component is an unbridged "half sandwich" metallocene. (See, U.S. Pat. No. 6,069,213, U.S. Pat. No. 5,026,798, U.S. Pat. No. 5,703,187, U.S. Pat. No. 5,747,406, U.S. Pat. No. 5,026,798 and U.S. Pat. No. 6,069,213, which are incorporated by reference herein.)

Non-limiting examples of metallocene catalyst components consistent with the description herein include, for example cyclopentadienylzirconium$A_n$; indenylzirconium$A_n$; (1-methylindenyl)zirconium$A_n$; (2-methylindenyl)zirconium$A_n$, (1-propylindenyl)zirconium$A_n$; (2-propylindenyl)zirconium$A_n$; (1-butylindenyl)zirconium$A_n$; (2-butylindenyl)zirconium$A_n$ methylcyclopentadienylzirconium$A_n$; tetrahydroindenylzireonium$A_n$; pentamethylcyclopentadienylzirconium$A_n$; cyclopentadienylzirconium$A_n$; pentamethylcyclopentadienyltitanium$A_n$; tetramethylcyclopentyltitanium$A_n$; (1,2,4-trimethylcyclopentadienyl)zirconium$A_n$; dimethylsilyl(1,2,3,4-tetramethylcyclopentadienyl)(cyclopentadiertypzirconium$A_n$; dimethylsilyl(1,2,3,4-tetramethyl cyclopentadienyl)(1,2,3-trimethyl cyclopentadienyl)zirconium$A_n$; dimethylsilyl(1,2,3,4-tetramethylcyclopentadienyl)(1,2-dimethylcyclopentadienyl)zirconium$A_n$; dimethylsilyl(1,2,3,4-tetramethylcyclopentadienyl)(2-methylcyclopentadienyl)zirconium$A_n$; dimethylsilylcyclopentadienylindenylzirconium$A_n$; dimethylsilyl(2-methylindenyl)(fluorenyp)zirconium$A_n$; diphenylsilyl(1,2,3,4-tetramethylcyclopentadienyl)(3-propylcyclopentadienyl)zirconium$A_n$; dimethylsilyl(1,2,3,4-tetramethylcyclopentadienyl)(3-t-butylcyclopentadienyl)zirconium$A_n$; dimethylgermyl(1,2-dimethylcyclopentadienyl)(3-isopropylcyclopentadienyl)zirconium$A_n$; dimethylsilyl(1,2,3,4-tetramethylcyclopentadienyl)(3-methylcyclopentadienyl)zirconium$A_n$; diphenylmethylidene(cyclopentadienyl)(9-fluorenyl)zirconium$A_n$; diphenylmethylidenecyclopentadienylindenylzirconium$A_n$; isopropylidenebiscyclopentadienylzirconium$A_n$; isopropylidene(cyclopentadienyl)(9-fluorenyl)zirconium$A_n$; isopropylidene(3-methylcyclopentadienyl)(9-fluorenyl)zirconium$A_n$; ethylenebis(9-fluorenyl)zirconium$A_n$; ethylenebis(1-indenyl)zirconium$A_n$; ethylenebis(1-indenyl)zirconium$A_n$; ethylenebis(2-methyl-1-indenyl)zirconium$A_n$; ethylenebis(2-methyl-4,5,6,7-tetrahydro-1-indenyl)zirconium$A_n$; ethylenebis(2-propyl-4,5,6,7-tetrahydro-1-indenyl)zirconium$A_n$; ethylenebis(2-isopropyl-4,5,6,7-tetrahydro-1-indenyl)zirconium$A_n$; ethylenebis(2-butyl-4,5,6,7-tetrahydro-1-indenyl)zirconium$A_n$; ethylenebis(2-isobutyl-4,5,6,7-tetrahydro-1-indenyl)zirconium$A_n$; dimethylsilyl(4,5,6,7-tetrahydro-1-indenyl)zirconium$A_n$; diphenyl(4,5,6,7-tetrahydro-1-indenyl)zirconium$A_n$; ethylenebis(4,5,6,7-tetrahydro-1-indenyl)zirconium$A_n$; dimethylsilylbis(cyclopentadienyl)zirconium$A_n$; dimethylsilylbis(9-fluorenyl)zirconium$A_n$; dimethylsilylbis(1-indenyl)zirconium$A_n$; dimethylsilylbis(2-methylindenyl)zirconium$A_n$; dimethylsilylbis(2-propylindenyl)zirconium$A_n$; dimethylsilylbis(2-butylindenyl)zirconium$A_n$; dimethylsilylbis(2-methylindenyl)zirconium$A_n$; diphenylsilylbis(2-propylindenyl)zirconium$A_n$; diphenylsilylbis(2-butylindenyl)zirconium$A_n$; dimethylgermylbis(2-methylindenyl)zirconium$A_n$; dimethylsilylbistetrahydroindenylzirconium$A_n$; dimethylsilylbistetramethylcyclopentadienylzirconium$A_n$; dimethylsilyl(cyclopentadienyl)(9-fluorenyl)zirconium$A_n$; diphenylsilyl(cyclopentadienyl)(9-fluorenyl)zirconium$A_n$; diphenylsilylbisindenylzirconium$A_n$; cyclotrimethylenesilyltetramethylcyclopentadienylcyclopentadienylzirconium$A_n$; cyclotetramethylenesilyltetramethylcyclopentadienylcyclopentadienylzircoMurn$A_n$; cyclotrimethylenesilyl(tetramethylcyclopentadienyl)(2-methylindenyl)zirconium$A_n$; cyclotrimethylenesilyl(tetramethylcyclopentadienyl)(3-methylcyclopentadienyl)zirconium$A_n$; cyclotrimethylenesilylbis(2-methylindenyl)zirconium$A_n$; cyclotrimethylenesilyl(tetramethylcyclopentadienyl)(2,3,5-trimethylclopentadienyl)zirconium$A_n$; cyclotrimethylenesilylbis(tetramethylcyclopentadienyl)zirconium$A_n$; dimethylsilyl(tetramethylcyclopentadieneyl)(N-tertbutylamido)titanium$A_n$; biscyclopentadienylchromium$A_n$; biscyclopentadienylzirconium$A_n$; bis(n-butylcyclopentadienyl)zirconium$A_n$; bis(n-dodecylcyclopentadienyl)zirconium$A_n$; bisethylcyclopentadienylzirconium$A_n$; bisisobutylcyclopentadienylzirconium$A_n$; bisisopropylcyclopentadienylzirconium$A_n$; bismethylcyclopentadienylzirconium$A_n$; bisoctylcyclopentadienylzirconium$A_n$; bis(n-pentylcyclopentadienyl)zirconium$A_n$; bis(n-propylcyclopentadienyl)zirconium$A_n$; bistrimethylsilylcyclopentadienylzirconium$A_n$; bis(1,3-bis(trimethylsilyl)cyclopentadienyl)zirconium(1-ethyl-2-methylcyclopentadienyl)zirconium$A_n$; bis(1-ethyl-3-methylcyclopentadienyl)zirconium$A_n$; bispentamethylcyclopentadienylzirconium$A_n$; bispentamethylcyclopentadienylzirconium$A_n$; bis(1-propyl-3-methylcyclopentadienyl)zirconium$A_n$; bis(1-n-butyl-3-methylcyclopentadienyl)zirconium$A_n$; bis(1-isobutyl-3-methylcyclopentadienyl)zirconium$A_a$; bis(1-propyl-3-butylcyclopentadienyl)zirconium$A_n$; bis(1,3-n-butylcyclopentadienyl)zirconium$A_n$; bis(4,7-dimethylindenyl)zirconium$A_n$; bisindenylzirconium$A_n$; bis(2-methylindenyl)zirconium$A_n$; cyclopentadienylindenylzirconium$A_n$; bis(n-propylcyclopentadienyl)hafnium$A_n$; bis(n-butylcyclopentadienyl)hafnium$A_n$; bis(n-pentylcyclopentadienyl)hafnium$A_n$; (n-propylcyclopentadienyl)(n-butylcyclopentadienyl)hafnium$A_n$; bis[p-trimethylsilylethyl)cyclopentadienyl]hafnium$A_n$; bis(trimethylsilylcyclopentadienyl)hafnium$A_n$; bis(2-n-propylindenyl)hafnium$A_n$; bis(2-n-butylindenyl)hafnium$A_n$; dimethylsilylbis(n-propylcyclopentadienyl)hafnium$A_n$; dimethylsilylbis(n-butylcyclopentadienyl)hafnium$A_n$; bis(9-n-propylfluorenyl)hafnium$A_n$; bis(9-n-butylfluorenyl)hafnium$A_n$; (9-n-propylfluorenyl)(2-n-propylindenyl)hafnium$A_n$; bis(1-n-propyl-2-methylcyclopentadienyl)hafnium$A_n$; (n-propylcyclopentadienyl)(1-n-propyl-3-n-butylcyclopentadienyl)hafnium$A_n$; ditnethylsilyitetramethylcyclopentadienylcyclopropylamidotitanium$A_n$; dimethylsilyltetramethylcyetopentadienyleyelobutylamidotitanium$A_n$; dimethylsilyltetratnethyleyclopentadienylcyclopentylamidotitanium$A_n$; dimethylsilyltetramethylcyclopentadienylcyclohexyltunidotitanium$A_n$; dimethylsilyttetrtunethyleyelopentadienylcycloheptylamidotitanium$A_n$; dimethylsilyitetramethylcyclopentadienylcyelooctylamidotitanitun$A_n$; dimethylsilyttetramethylcyclopentadienylcyclnnonylamidotitanium$A_n$; dimethylsilyttetramethylcyclopentadienylcyclodecylamidotitaniurn$A_n$; dimethylsilyttetramethylcyclopentadienylcycloundecylamidotitanitun$A_n$; dimethylsilyltetramethyleyclopentadienyleyclodoclecylamidotitanitunk; dimethylsilyltetramethylcyclopentadienyl(sec-butylamido)titanium$A_n$; dimethylsilyl(tetramethylcyclopentadienyl)(n-octylamido)titanium$A_n$; dimethylsilyl(tetramethylcyclopentadienyl)(n-decylamido)titanium$A_n$; dimethylsilyl(tetramethylcyclopentadienyl)(n-octadecylamido)titanium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; dimethylsilyl(2,4-dimethylcyclopentadienyl)(3',5'-dimethylcyclopentadienyl)zirconium$A_n$; dimethylsilyl(2,3,5-trimethylcyclopentadienyl)(2',4',5'-dimethylcyclopentadienyl)zirconium$A_n$; dimethylsilylbis(t-butylcyclopentadienyl)zirconium$A_n$; dimethylsilylbis(trimethylsilylcyclopentadienyl)zirconium$A_n$; dimethylsilylbis(2-trimethylsilyl-4-t-butylcyclopentadienyl)zirconium$A_n$; dimethylsilylbis(4,5,6,7-tetrahydro-indenyl)zirconium$A_n$; dimethylsilylbis(indenyl)zirconium$A_n$; dimethylsilylbis(2-methylindenyl)zirconium$A_n$; dimethylsilylbis(2,4-dimethylindenyl)zirconium$A_n$; dimethylsilylbis(2,4,7-trimethylindenyl)zirconium$A_n$; dimethylsilylbis(2-methyl-4-phenylindenyl)zirconium$A_n$; dimethylsilylbis(2-ethyl-4-phenylindenyl)zirconium$A_n$; dimethylsilylbis(benz[e]indenyl)zirconium$A_n$; dimethylsilylbis(2-methylbenz[e]indenyl)zirconium$A_n$; dimethylsilylbis(benz[f]indenyl)zirconium$A_n$; dimethylsilylbis(2-methylbenz[f]indenyl)zirconium$A_n$; dimethylsilylbis(3-methylbenz[f]indenyl)zirconium$A_n$; dimethylsilylbis(cyclopenta[cd]indenyl)zirconium$A_n$; dimethylsilylbis(cyclopentadienyl)zirconium$A_n$; dimethylsilylbis (tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; isopropylidene(cyclopentadienyl-3-methylfluorenyl)zirconium$A_n$; isoropylidene(cyclopentadienyl-4-methylfluorenyl)zirconium$A_n$; isopropylidene(cyclopentadienyl-octahydrofluorenyl)zirconium$A_n$; isopropylidene(methylcyclopentadienyl-fluorenyl)zirconium$A_n$; isopropylidene(dimethylcyclopentadienylfluorenyl)zirconium$A_n$; isopropylidene(tetramethylcyclopentadienylfluorenyl)zirconium$A_n$; diphenylmethylene(cyclopentadienyl-fluorenyl)zirconium$A_n$; diphenylmethylene(cyclopentadienyl-indenyl)zirconium$A_n$; diphenylmethylene(cyclopentadienyl-2,7-di-t-butylfluorenyl)zirconium$A_n$; diphenylmethylene(cyclopentadienyl-3-methylfluorenyl)zirconium$A_n$; diphenylmethylene(cyclopentadienyl-4-methylfluorenyl)zirconium$A_n$; diphenylmethylene(cyclopentadienyloctahydrofluorenyl)zirconium$A_n$; diphenylmethylene(methylcyclopentadienyl-fluorenyl)zirconium$A_n$; diphenylmethylene(dimethylcyclopentadienyl-fluorenyl)zirconium$A_n$; diphenylmethylene(tetramethylcyclopentadienyl-fluorenyl)zirconium$A_n$; cyclohexylidene(cyclopentadienyl-fluorenyl)zirconium$A_n$; cyclohexylidene(cyclopentadienylindenyl)zirconium$A_n$; cyclohexylidene(cyclopentadienyl-2,7-di-t-butylfluorenyl)zirconium$A_n$; cyclohexylidene(cyclopentadienyl-3-methylfluorenyl)zirconium$A_n$; cyclohexylidene(cyclopentadienyl-4-methylfluorenyl)zirconium$A_n$; cyclohexylidene(cyclopentaclienyloctahydrofluorenyl)zirconium$A_n$; cyclohexylidene(methylcyclopentadienylfluorenyl)zirconium$A_n$; cyclohexylidene(dimethylcyclopentadienyl-fluorenyl)zirconium$A_n$; cyclohexylidene(tetramethyleyclopentadienylfhiorenyl)zirconium$A_n$; dimethylsilyl(cyclopentadienyl-fluorenyl)zirconium$A_n$; dimethylsilyl(cyclopentadienyl-indenyl)zirconium$A_n$; dimethylsilyl(cyclopentadienyl-2,7-di-t-butylfluorenyl)zirconium$A_n$; dimethylsilyl(cyclopentadienyl-3-methylfluorenyl)zirconium$A_n$; dimethylsilyl(cyclopentadienyl-4-methylfluorenyl)zirconium$A_n$; dimethylsilyl(cyclopentadienyl-octahydrofluorenyl)zirconium$A_n$; dimethylsilyl(methylcyclopentanedienyl-fluorenyl)zirconium$A_n$; dimethylsilyl(dimethylcyclopentadienylfluorenyl)zirconium$A_n$; dimethylsilyl(tetramethylcyclopentadienylfluorenyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; cyclohexylidene(cyclopentadienylfluorenyl)zirconium$A_n$; cyclohexylidene(cyclopentadienyl-2,7-di-t-butylfluorenyl)zirconium$A_n$; dimethylsilyl(cyclopentadienylfluorenyl)zirconium$A_n$; methylphenylsilyltetramethylcyclopentadienylcyclopropylamidotitanium$A_n$; methyphertylsilyltetramethylcyclopentadienylcyclobutylamidotitanium$A_n$; methylphenylsilyitetramethylcyclopentadienylcyclopentylamidotitanium$A_n$; methylphenylsilyltetramethylcyclopentadienylcyclohexylamidotitanium$A_n$; methylphenylsilyltetramethylcyclopentadienylcycloheptylamidothanium$A_n$; methylphenylsilyltetramethylcyclopentadienylcyclooctylamidotitanium$A_n$; methylphenylsilyltetramethylcyclopentadienylcyclononylamidotitanium$A_n$; methylphenylsilyltetramethylcyclopentadienylcyclodecylamidotitanium$A_n$; methylphenylsitylietramethylcyclopentadienylcycloundecylamidotitanium$A_n$; methylphenylsilyhetramethylcyclopentadienylcyclododecylamidotitanium$A_n$; methylphenylsilyl(tetramethylcyclopentadienyl)(sec-butylamido)titanium$A_n$; methylphenylsilyl(tetramethylcyclopentadienyl)(n-octylamido)titanium$A_n$; methylphenylsilyl(tetramethylcyclopentadienyl)(n-decylamido)titanium$A_n$; methylphenylsilyl(tetramethylcyclopentadienyl)(n-octadecylamido)titanium$A_n$; diphenylsilyhetramethylcyclopentadienylcyclopropylamidotitanium$A_n$; diphenylsilyitetramethyleyclopentadienyleyclobutylamidotitanium$A_n$; diphenylsilyltetramethylcyclopentadienylcyclopentylamidotitanium$A_n$; diphenylsilyltetramethylcyclopentadienylcyclohexylamidotitanium$A_n$; diphenylsilyltetramethylcyclopentadienylcycloheptylamidotitanium$A_n$; diphenylsilyltetramethylcyclopentadienylcyclooctylamidotitanium$A_n$; diphenylsilyltetramethylcyclopentadienylcyclononylamidotitaniunik$A_n$; diphenylsilyltetramethylcyclopentadienylcyclodecylamidotitanium$A_n$; diphenylsilyltetramethylcyclopentadienylcycloundecylamidotitanium$A_n$; diphenylsilyltetramethylcyclopentadienylcyclododecylamidotitanium$A_n$; diphenylsilyl(tetramethylcyclopentadienyl)(sec-butylamido)titanium$A_n$; diphenylsilyl(tetramethylcyclopentadienyl)(n-octylamido)titanium$A_n$; diphenylsilyl(tetramethylcyclopentadienyl)(n-decylamido)titanium$A_n$; and diphenylsilyl(tetramethylcyclopentadienyl)(n-octadecylamido)titanium$A_n$.

In one embodiment, the first catalyst component includes a metallocene catalyst capable of producing a propylene homopolymer having a high melting point (e.g., a $T_m$ of at least about 120° C., or at least about 130° C., or from about 135° C. to about 167° C. or from about 140° C. to about 160° C.).

In one or more embodiments, the first catalyst component is represented by the general formula:

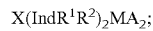

$$X(IndR^1R^2)_2MA_2;$$

wherein X is a structural bridge between hid, Ind is an indenyl group, $R^1$ is a substituent on the $2^{nd}$ position and is an alkyl, $R^2$ is a substituent on the $4^{th}$ position and is a phenyl, M is a transition metal and A is an alkyl, hydrocarbyl or halogen group.

In one or more embodiments, the first catalyst component is dimethylsilylbis(2-methyl-4-phenyl-indenyl)zirconium dichloride.

In one embodiment, the second catalyst component includes a metallocene catalyst capable of producing a propylene homopolymer having a melting point within the range identified for the first catalyst component. However, in contrast to the first catalyst component, the second catalyst component exhibits the ability to incorporate ethylene at a higher level than the first catalyst component (hereinafter referred to as ethylene response), thereby resulting in lower melting points of the formed polymer. In one or more embodiments, the ethylene is incorporated in an amount sufficient to lower the melting temperature of the polymer to a desired level. For example, the second catalyst component may be capable of at least about 60%, or at least about 65%, or at least about 0.70% or at least about 75% ethylene incorporation (incorporates at least the specified percentage of the ethylene in the monomer feed into the polymer product).

In one embodiment, the second catalyst component includes a metallocene catalyst capable of producing a propylene/ethylene random copolymer having, a lower melting point than a propylene/ethylene random copolymer formed by the first catalyst component. In one embodiment, the second catalyst component includes a metallocene catalyst capable of producing a propylene/ethylene random copolymer having a low melting point (e.g., a $T_m$ of less than about 125° C.). In one or more embodiments, the second catalyst component is capable of producing a propylene/ethylene random copolymer having a melting point of at least about 10° C., or at least about 15° C. or at least about 23° C. lower than the melting point of a propylene/ethylene random copolymer formed by the first catalyst, for example.

It has been observed that the utilization of the second catalyst component provides for a formed polymer having a lower seal initiation temperature (SIT) than that of a polymer formed by the first catalyst component alone, while the polymer formed from the multi-component catalyst system retains a melting temperature that is increased over a polymer formed from the second catalyst component alone.

In one or more embodiments, the second catalyst component is represented by the general formula:

wherein X is a structural bridge between Ind, Ind is an indenyl group, $R^1$ is a substituent on the $2^{ad}$ position and is an alkyl, $R^2$ is a benzo group at the 4,5 position, M is a transition metal and A is an alkyl, hydrocarbyl or halogen group.

In one or more embodiments, the second catalyst component is dimethylsilylbis(2-methyl-4,5-benzo-indenyl)zirconium dichloride.

In one or more specific embodiments, the second catalyst component is represented by the general formula:

wherein X is a structural bridge between Fl and Cp, Fl is a fluorenyl group, Cp is a cyclopentadienyl group, M is a transition metal and A is an alkyl, hydrocarbyl or halogen group.

In one or more embodiments, the second catalyst component is diphenylmethylene(2,7-di-tert-butyl-fluorenyl)(2-methyl-4-tert-butyl-cyclopentadienyl)zirconium dichloride.

In one or more embodiments, the second catalyst component is dimethylmethylene(fluorenyl)(2-methyl-4-tert-butyl-cyclopentadienyl)zirconium dichloride.

The first catalyst component may contact the second catalyst component in a weight ratio of from about 10:1 to about 1:10, or from about 8:1 to about 1:8 or from about 5:1 to about 1:5, for example.

In certain embodiments, the methods described herein further include contacting one or more of the catalyst components with a catalyst activator, herein simply referred to as an "activator". In one or more embodiments; the activator includes a "first activator", a "second activator" or a combination thereof. Alternatively, the activator may include a single composition capable of activating both the first catalyst component and the second catalyst component.

For example, the metallocene catalysts may be activated with a metallocene activator for subsequent polymerization. As used herein, the term "metallocene activator" is defined to be any compound or combination of compounds, supported or unsupported, which may activate a single-site catalyst compound (e.g., metallocenes, Group 15 containing catalysts, etc.) This may involve the abstraction of at least one leaving group (A group in the formulas/structures above, for example) from the metal center of the catalyst component. The metallocene catalysts are thus activated towards olefin polymerization using such activators.

Embodiments of such activators include Lewis acids, such as cyclic or oligomeric polyhydrocarbylaluminum oxides, non-coordinating ionic activators (NCA), ionizing activators, stoichiometric activators, combinations thereof or any other compound that may convert a neutral metallocene catalyst component to a metallocene cation that is active with respect to olefin polymerization.

The Lewis acids may include alumoxane (e.g., "MAO"), modified alumoxane (e.g., "TIBAO") and alkylaluminum compounds, for example. Non-limiting examples of aluminum alkyl compounds may include trimethylaltuninum, triethylaluminum, triisobutylaluminum, tri-n-hexylaluminum and tri-n-octylaluminum, for example.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., tri(n-butyl)ammoniumtetrakis(pentafluorophenyl)borate and/or trisperfluorophenyl boron metalloid precursors), for example. The substituent groups may be independently selected from alkyls, alkenyls, halogen, substituted alkyls, aryls, arylhalides, alkoxy and halides, for example. In one embodiment, the three groups are independently selected from halogens, mono or multicyclic (including halosubstituted) aryls, alkyls, alkenyl compounds and mixtures thereof, for example. In another embodiment, the three groups are selected from $C_1$ to $C_{20}$ alkenyls, $C_1$ to $C_{20}$ alkyls, $C_1$ to $C_{20}$ alkoxys, $C_3$ to $C_{20}$ aryls and combinations thereof, for example. In yet another embodiment, the three groups are selected from the group highly halogenated $C_1$ to $C_4$ alkyls, highly halogenated phenyls, and highly halogenated naphthyls and mixtures thereof, for example. By "highly halogenated", it is meant that at least 50% of the hydrogens are replaced by a halogen group selected from fluorine, chlorine and bromine.

Illustrative, not limiting examples of ionic ionizing activators include trialkyl-substituted ammonium salts (e.g., triethylammoniumtetraphenylborate, tripropylammoniumtetraphenylborate, tri(n-butyl)ammoniumtetraphenylborate, trimethylammoniumtetra(p-tolyl)borate, trimethylammoniumtetra(o-tolyl)borate, tributylammoniumtetra(pentafluorophenyl)borate, tripropylammoniumtetra(o,p-dimethylphenyl)borate, tributylammoniumtetra(m,m-dimethylphenyl) borate, tributylammoniumtetra(p-tri-fluoromethylphenyl) borate, tributylammoniumtetra(pentafluorophenyl)borate and tri(n-butyl)ammoniumtetra(o-tolyl)borate), N,N-dialkylanilinium salts (e.g., N,N-dimethylaniliniumtetraphenylborate, N,N-diethylaniliniumtetraphenylborate and N,N-2,4, 6-pentamethylaniliniumtetraphenylborate), dialkyl ammonium salts (e.g., diisopropylammoniurntetrapentafluorophenylborate and dicyclohexylammoniumtetraphenylborate), triaryl phosphonium salts (e.g., triphenylphosphoniumtetraphenylborate, trimethylphenylphosphoniumtetraphenylborate and tridimethylphenylphosphoniumtetraphenylborate) and their aluminum equivalents, for example.

In yet another embodiment, an alkylaluminum compound may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment, for example.

The heterocyclic compound for use as an activator with an alkylaluminum compound may be unsubstituted or substituted with one or a combination of substituent groups. Examples of suitable substituents include halogens, alkyls, alkenyls or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals or any combination thereof, for example.

Non-limiting examples of hydrocarbon substituents include methyl, ethyl, propyl, butyl, pentyl, hexyl, cyclopentyl, cyclohexyl, benzyl, phenyl, fluoromethyl, fluoroethyl, difluoroethyl, iodopropyl, bromohexyl or chlorobenzyl, for example.

Non-limiting examples of heterocyclic compounds utilized include substituted and unsubstituted pyrroles, imidazoles, pyrazoles, pyrrolines, pyrrolidines, purines, carbazoles, indoles, phenyl indoles, 2,5-dimethylpyrroles, 3-pentafluorophenylpyrrole, 4,5,6,7-tetrafluoroindole or 3,4-difluoropyrroles, for example.

Combinations of activators are also contemplated by the invention, for example, alumoxanes and ionizing activators in combinations. Other activators include aluminum/boron complexes, perchlorates, periodates and iodates including their hydrates, lithium (2,2'-bisphenyl-ditrimethylsilicate)-4T-HF and silylium salts in combination with anon-coordinating compatible anion, for example. In addition to the compounds listed above, methods of activation, such as using radiation and electro-chemical oxidation are also contemplated as activating methods for the purposes of enhancing the activity and/or productivity of a single-site catalyst compound, for example. (See, U.S. Pat. No. 5,849,852, U.S. Pat. No. 5,859,653, U.S. Pat. No. 5,869,723 and WO 98/32775.)

The catalyst may be activated in any manner known to one skilled in the art. For example, the catalyst and activator may be combined in molar ratios of activator to catalyst of from 1000:1 to 0.1:1, or from 500:1 to 1:1, or from about 100:1 to about 250:1, or from 150:1 to 1:1, or from 50:1 to 1:1, or from 10:1 to 0.5:1 or from 3:1 to 0.3:1, for example.

The activators may or may not be associated with or bound to a support, either in association with one or more catalyst component or separate from the catalyst component(s), such as described by Gregory G. Hlalky, *Heterogeneous Single-Site Catalysts for Olefin Polymerization* 100(4) CHEMICAL REVIEWS 1347-1374 (2000).

For example, each different catalyst component may reside on a single support particle, so that the multi-component catalyst is a supported multi-component catalyst. However, as used herein, the term multi-component catalyst also broadly includes a system or mixture in which one of the catalysts (e.g., the first catalyst component) resides on one collection of support particles and another catalyst (e.g., the second catalyst component) resides on another collection of support particles. In the latter instance, the two supported catalysts are introduced to a single reactor, either simultaneously or sequentially and polymerization is conducted in the presence of the multi-component catalyst. In certain embodiments, an unsupported version of the multi-component catalyst described herein can be used in a polymerization process, i.e., in which the monomers are contacted with a multi-component catalyst that is not supported.

The support materials may include talc, inorganic oxides, clays and clay minerals, ion-exchanged layered compounds, diatomaceous earth compounds, zeolites or a resinous support material, such as a polyolefin, for example.

Specific inorganic oxides include silica, alumina, magnesia, titania and zirconia, which may be physically or chemically mixed, for example. The inorganic oxides used as support materials may have an average particle size of from 5 microns to 600 microns or from 10 microns to 100 microns, a surface area of from 50 $m^2/g$ to 1,000 $m^2/g$ or from 100 $m^2/g$ to 400 $m^2/g$ and a pore volume of from 0.5 cc/g to 3.5 cc/g or from 0.5 cc/g to 2 cc/g, for example.

Methods for supporting metallocene catalysts are generally known in the art. (See, U.S. Pat. No. 5,643,847, U.S. Pat. No. 9,184,358 and U.S. Pat. No. 9,184,389, which are incorporated by reference herein.)

Various methods can be used to affix two different catalysts to a support to form a multi-component catalyst (also referred to as a "mixed catalyst"). For example, one procedure for preparing a supported multi-component catalyst can include providing a supported first catalyst component, contacting a slurry including the first catalyst component and a non-polar hydrocarbon with a mixture (solution or slurry) that includes the second catalyst component, which may also include an activator. The procedure may further include drying the resulting product that includes the first and second catalyst components and recovering a multi-component catalyst composition. Alternatively, it is contemplated that the first and second catalyst components may be independently fed to one or more reaction zones, so long as each reaction zone includes a multi-component system as described herein.

Optionally, the support material, one or more of the catalyst components, the catalyst system or combinations thereof, may be contacted with one or more scavenging compounds prior to or during polymerization. The term "scavenging compounds" is meant to include those compounds effective for removing impurities (e.g., polar impurities) from the subsequent polymerization reaction environment. Impurities may be inadvertently introduced with any of the polymerization reaction components, particularly with solvent, monomer and catalyst feed, and adversely affect catalyst activity and stability. Such impurities may result in decreasing, or even elimination, of catalytic activity, for example. The polar impurities or catalyst poisons may include water, oxygen and metal impurities, for example.

The scavenging compound may include an excess of the aluminum containing compounds described above, or may be additional known organometallic compounds, such as Group 13 organometallic compounds. For example, the scavenging compounds may include triethyl aluminum (TEAl), triisobutyl aluminum (TIBAl), methylalumoxane (MAO), isobutyl aluminoxane, dialkyl zinc compounds and tri-n-octyl aluminum. In one specific embodiment, the scavenging compound is TEAl.

In one embodiment, the amount of scavenging compound is minimized during polymerization to that amount effective to enhance activity and avoided altogether if the feeds and polymerization medium may be sufficiently free of impurities.

Unexpectedly, it has been observed that embodiments of the invention exhibit increased catalyst activity compared to identical processes absent the first catalyst component.

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene; propylene, butene, pentene, 4-methyl-1-pentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norbornene, dicyclopentadiene and cyclopentene, for example. The formed polymer may include homopolymers, copolymers or terpolymers, for example.

Examples of solution processes are described, in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid wider the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop; which can itself be filled with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any suitable method, such as via a double jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

The polymers can have a variety of compositions, characteristics and properties. At least one of the advantages of the multi-component catalysts is that the process utilized can be tailored to form a polymer composition having a desired set of properties. Furthermore, the multi-component catalysts are capable of forming a polymer exhibiting a broad composition distribution (i.e., a broadening of properties relative to a polymer formed from either the first catalyst component or the second catalyst component alone). A non-limiting discussion of such properties follows.

In one or more embodiments, the polymers include propylene based polymers. As used herein, the term "propylene based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % propylene relative to the total weight of polymer, for example.

The propylene based polymers may include about 15 wt. % or less, or about 12 wt. % or less, or about 10 wt. % or less, or about 6 wt. % or less, or about 5 wt. % or less, or about 4 wt. % or less or less than about 2 wt. % of xylene soluble material (XS), for example (as measured by ASTM D5492-06).

The propylene based polymers may have a melt flow rate (MFR) (as measured by ASTM D-1238) of from about 0.01 dg/min to about 1000 dg/min., or from about 0.01 dg/min. to about 100 dg/min. or from about OA dg/min. to about 20 dg/min., for example.

In one or more embodiments, the polymers include polypropylene homopolymers. Unless otherwise specified, the term "polypropylene homopolymer refers to propylene homopolymers or those polymers composed primarily of propylene and amounts of other comonomers, wherein the amount of comonomer is insufficient to change the crystalline nature of the propylene polymer significantly.

In one or more embodiments, the polymers include propylene based random copolymers. Unless otherwise specified, the term "propylene based random copolymer" refers to those copolymers composed primarily of propylene and an amount of at least one comonomer, wherein the polymer includes at least about 0.5 wt. %, or at least about 0.8 wt. %, or at least about 2 wt. %, or from about 0.5 wt. % to about 10 wt. %, or from about 2 wt. % to about 6 wt. % comonomer relative to the total weight of polymer, for example. The comonomers may be selected from $C_2$ to $C_{10}$ alkenes. For example, the comonomers may be selected from ethylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

Unexpectedly; polymers formed via the embodiments described herein exhibit a desirably high melting point while also exhibiting a desirably low seal initiation temperature for film applications. The broad composition distribution resultant in, the formed polymers (and particularly the low SIT in combination with the higher melting point) provide for compatibility in multi-layer films. For example, when the melting temperature of the formed polymer is similar to a second layer in a multi-layer film, compatibility is improved, while at the same time lowering the seal initiation temperature of such multi-layer film. In one or more embodiments, the polymer exhibits a seal initiation temperature of less than about 110° C., or less than about 105° C., or less than about 1.00° C. or less than about 95° C., for example.

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film; cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

One or more embodiments of the invention include utilizing the polymers in film applications, such as biaxially oriented film, for example. Other embodiments of the invention include utilizing the polymers in melt formed films, such as blown films and cast films. Blown films may be formed by forcing molten polymer through a circular die, which is then blown. The resultant bubble is then flattened and cut into strips, that when rolled, produces rolls of flat film. In contrast, cast films may be formed by passing molten polymer through an extruder, forcing the resultant thin layer over a chill roll to form a cool roll. The resulting cool roll is then cut and rolled into the cast film.

It is contemplated that the polymers described herein may be used as one or more layers, such as a heat seal layer, in the films described above.

EXAMPLES

Example 1

A mixture of two metallocene catalysts was co-supported on the same silica support material. The first metallocene (#1) was $Me_2Si(2\text{-methyl-4-phenyl-1-indenyl})_2ZrCl_2$, which yields isotactic polypropylene. The second metallocene (#2) was $Me_2Si(2\text{-methyl-4,5-benzo-1-indenyl})_2ZrCl_2$, which also produces isotactic polypropylene. A catalyst pot was charged with mineral oil slurries (≈1 kg of catalyst, 10-20 wt. % catalyst) and then diluted to ≈0.7 wt % with hexane prior to introduction into a reactor. Table 1 illustrates catalyst preparation and polymerization specifications.

TABLE 1

| Catalyst System | #1:#2 (wt ratio) | Silica Support, MAO/SiO$_2$ (wt ratio) | MF Target (dg/min) | Ethylene Target (wt % in resin) |
|---|---|---|---|---|
| #1 + #2 | 1:1 | G952, 0.75/1.0 | 10 | 4.0 |

The catalyst (20 wt. % in mineral oil) was charged and ultimately diluted to 0.73 wt. % with hexane. Initial production targets are shown in

TABLE 2

| Variable | Output |
|---|---|
| Propylene to pump seal flush (lb/h) | 20 |
| Chilled propylene feed (lb/h) | 100 |
| Reactor feed (lb/h) | 20 |
| Hydrogen rate (g/h) | 0.4 |
| Calculated H$_2$ in feed (ppm wt) | 6.3 |
| Calculated H$_2$ in feed (mol %) | 0.013 |
| 15 wt % TEAl solution (g/h) | 47.7 |
| Calculated COFAC | 0.8 |
| Calculated TEAl in feed (ppm wt) | 113 |
| 0.6 wt % Stadis solution (mL/h) | 39.4 |
| Calculated Stadis in feed (ppm wt) | 2.5 |
| IPA rate (mL/h) | 12 |
| Calculated KillFac | 3.2 |
| 15 wt % Irganox 1076 solution (mL/h) | 25 |
| Calculated Step 1 in fluff (ppm wt) | 370 |
| Hexane catalyst flush (lb/h) | 5 |
| Catalyst addition (shots/h) | 8 |
| Fluff Dryer Temperature (° F.) | 110 |
| Chilled propylene temperature (° F.) | 15 |
| Reactor Temperature (° F.) | 140 |
| Reactor Pressure (psig) | 600 |
| Production rate (lb/h) | 15 |
| Flash line temperature (° F.) | 120 |
| Flash tank pressure (psig) | 8 |

Polymerization was undertaken via the targets illustrated in Tables 1 and 2 and polymer samples taken. Table 3 illustrates the properties of the polymer samples further analyzed.

TABLE 3

| Amount (lb) | Catalyst | Spot MF (dg/min) | Ethylene Feed (lb/h) | Spot Ethylene (wt %) |
|---|---|---|---|---|
| 35 | 1/2 | 9.0 | 0.0 | 0.0 |
| 75 | 1/2 | 10.0 | 1.1 | 0.7 |
| 60 | 1/2 | 14.2 | 2.9 | — |
| 50 | 1/2 | 15.0 | 3.5 | 4.0 |
| 40 | 1/2 | 12.0 | 4.1 | 5.4 |

FIG. 1 illustrates DSC of the polymer sample having 4.1 lb/h (4.4 mol. %) of ethylene feed, which illustrates the discussed broad composition distribution with respect to melting temperature of the formed polymer.

Figure 2:
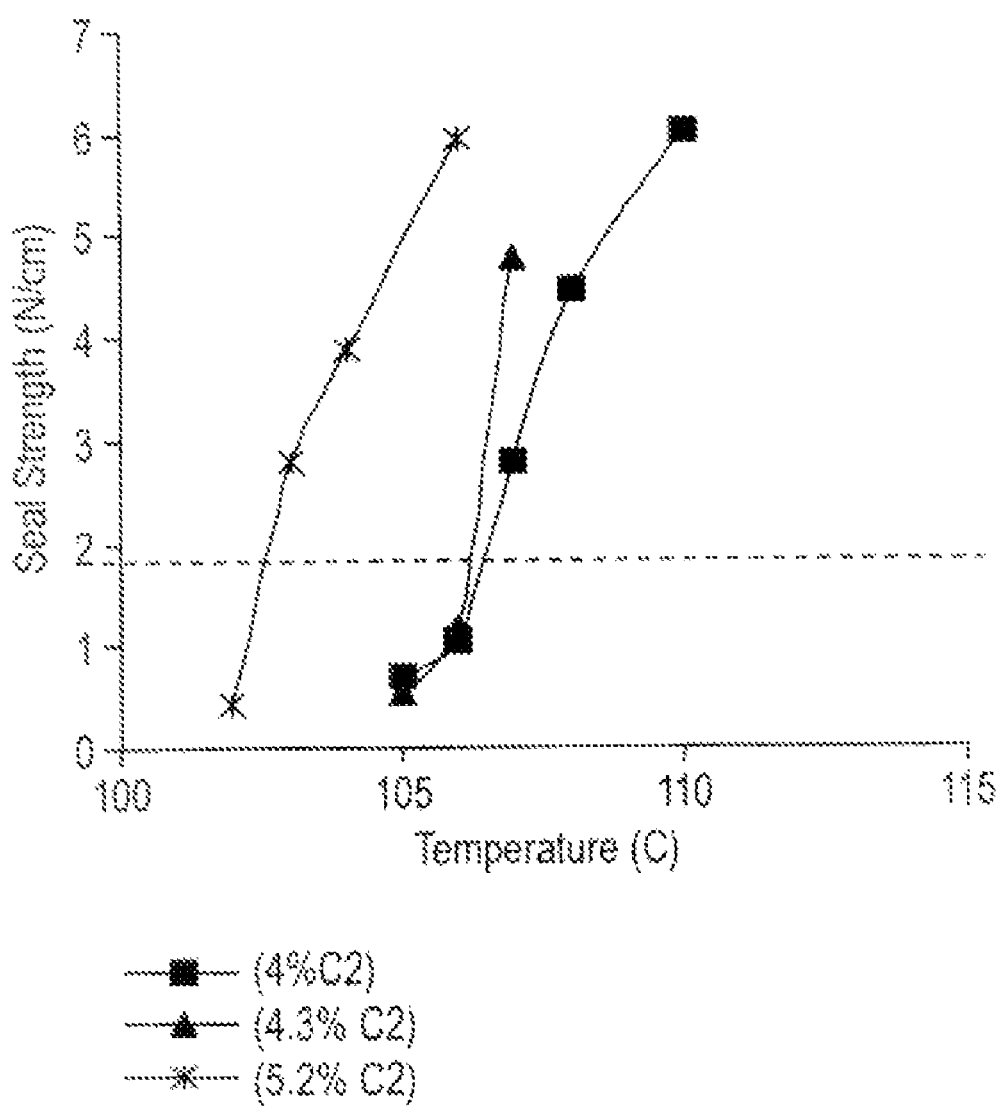
FIG. 2 illustrates seal strength of polymer samples.

FIG. 2 further illustrates the seal strength (and seal initiation temperature—at dotted line) properties of the analyzed polymer samples. As illustrated by FIGS. 1 and 2, the random copolymer samples exhibited a decreased seal initiation temperature while retaining a significantly high melting temperature.

Example 2

Figure 3:
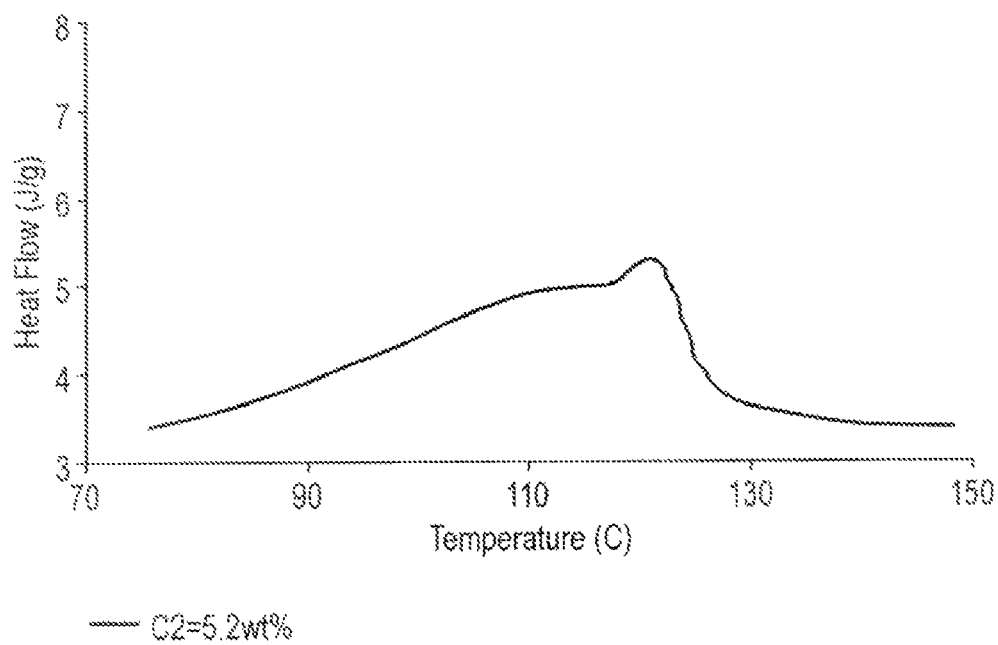
FIG. 3 illustrates a DSC trace of polymer samples.
Figure 4:
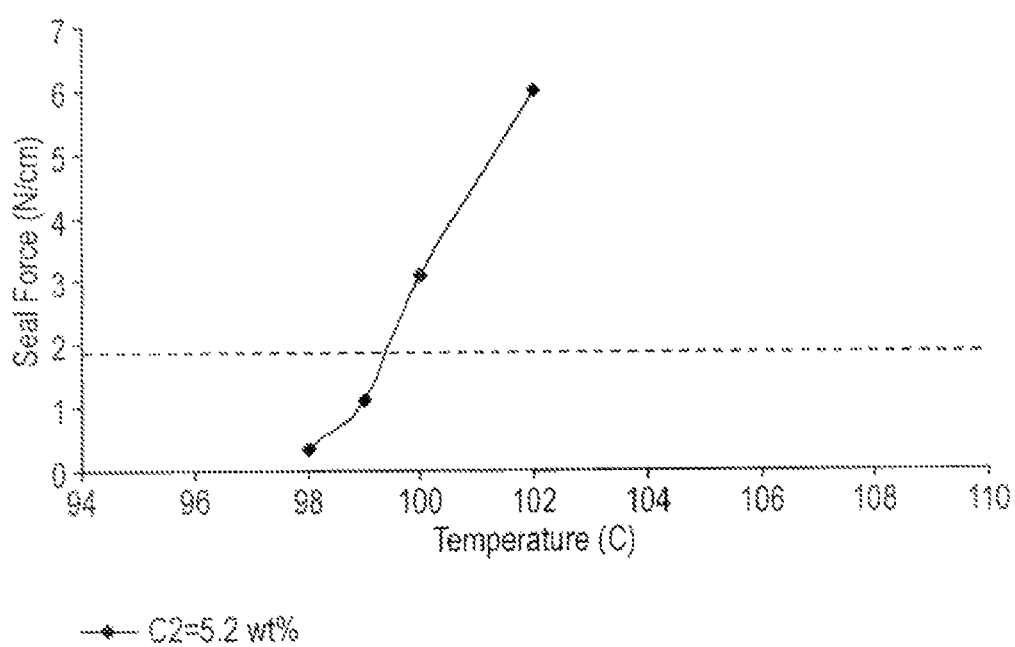
FIG. 4 illustrates seal initiation curves of polymer samples.
Figure 5:
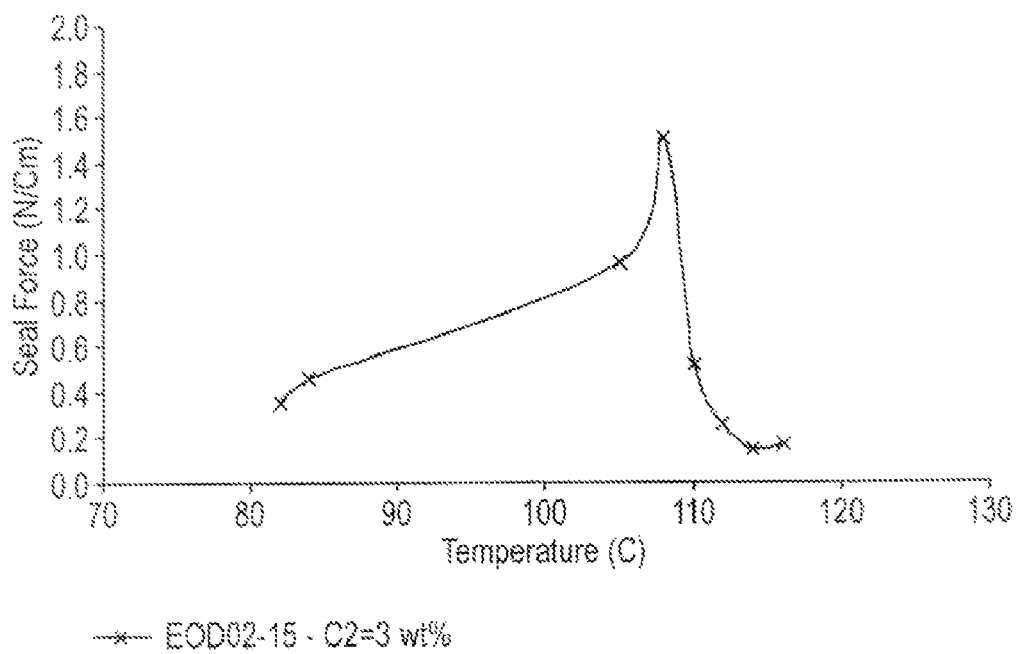
FIG. 5 illustrates hot tack curves of polymer samples.

Additional polymerization runs were undertaken via the process described in Example 1 to analyze the effect of varying the first catalyst to second catalyst ratio and type of catalyst prep. A mixture (rather than a co-support) of the first catalyst and the second catalyst was prepared and then supported on a silica-support material in a weight ratio of 1:2, rather than 1:1 as in Example 1 and subjected to polymerization. Samples were then analyzed and the results shown in FIGS. 3 (illustrating DSC results/broad melt temperature distribution), 4 (illustrating seal force and SIT) and 5 (illustrating maximum seal force). It was observed that at about the same ethylene level, a ratio of catalyst 1 to catalyst 2 of 1:2 resulted in a lower seal initiation temperature than a ratio of 1:1. It did not appear that mixing, rather than co-supporting, affected such results.

Example 2

Figure 6:
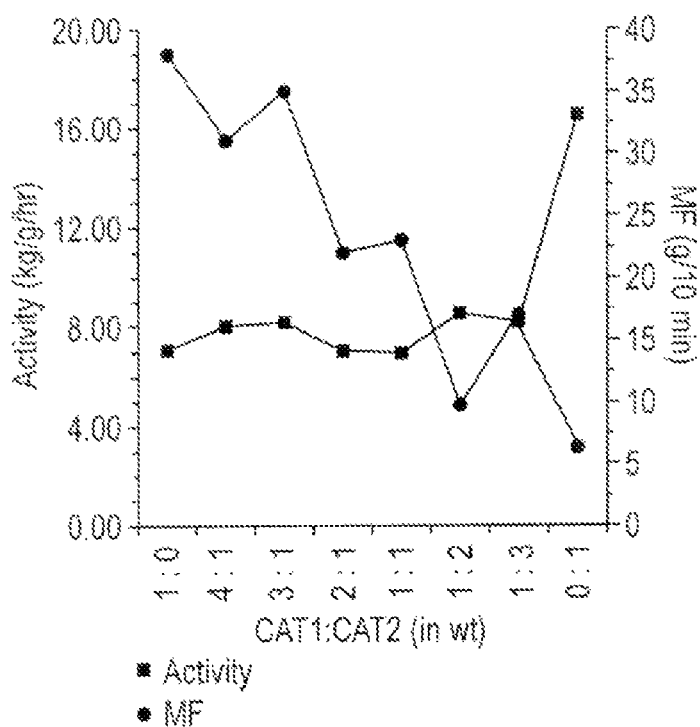
FIG. 6 illustrates activity of various catalyst compositions and melt flows of the resultant polymers.
Figure 7:
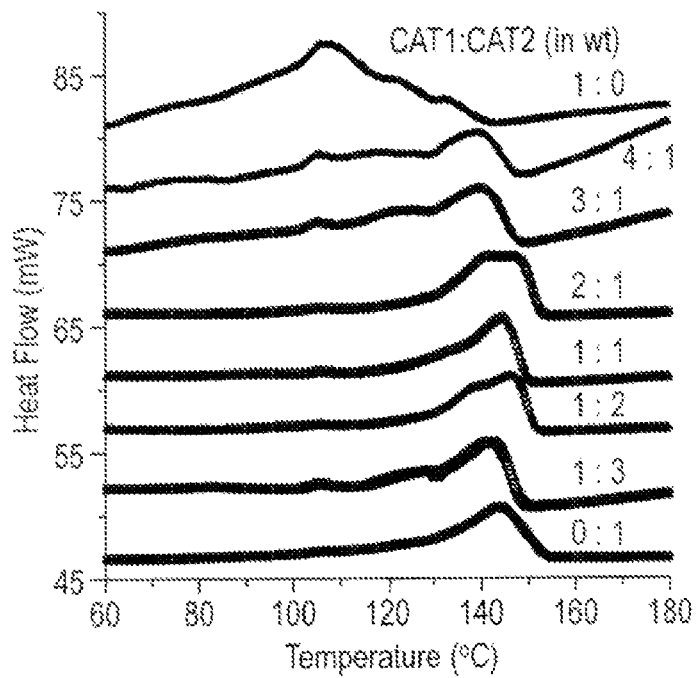
FIG. 7 illustrates DSC melting profiles of polymers formed from various catalyst compositions.
Figure 8:
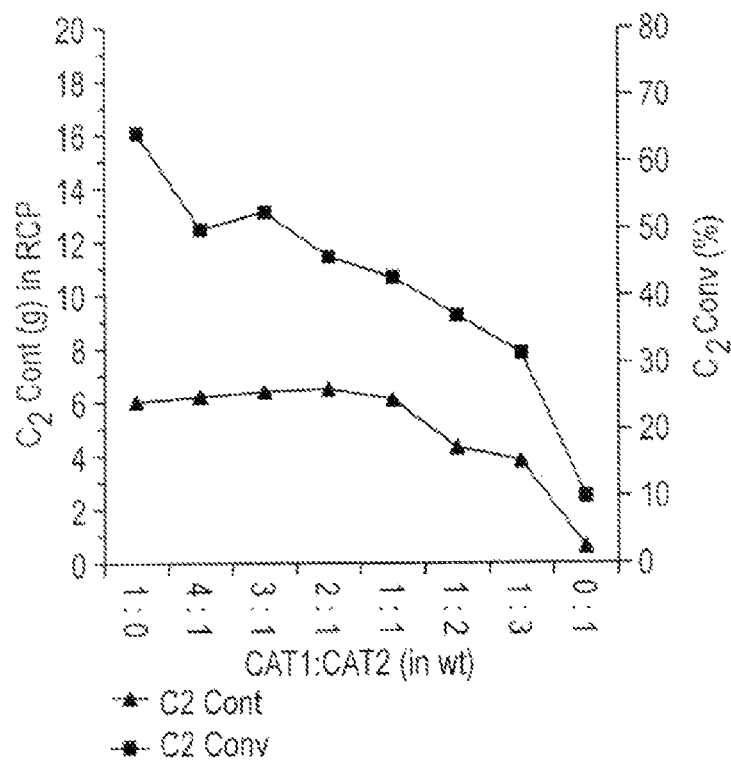
FIG. 8 illustrates ethylene enchainment for polymers prepared from various catalyst compositions.

A first metallocene catalyst (rac-dimethyl silylanediylbis (2-methyl-4-phenyl-1-indenyl)zirconium dichloride) and a second metallocene catalyst (dimethylmethylene (2-methyl-4-tert-butyl-cyclopentadienyl-1-fluorenyl)zirconium dichloride) were co-supported on an MAO-modified silica carrier and such mixed catalyst system was utilized to form propylene ethylene random copolymers. It was observed that the mixed catalyst system broadened the composition distribution (see, Table 4) over polymers formed with the second catalyst alone. The activity was further observed to remain essentially unchanged despite a change in catalyst 1 to catalyst 21 ratio, while the melt flow decreased with additional increase in catalyst 2 (see, FIG. 6). Additional physical properties were analyzed and are illustrated in FIGS. 7 (DSC melt temperature) and 8 (ethylene conversion and content in formed polymer). The balance between the two important factors for better physical properties and improved plant operability to produce low SIT mRCP leads to mixed catalyst formulation of a 1:1 weight ratio with 2.0 wt % total metallocene loading on (0.70 MAO/1.0 $SiO_2$ in wt) support.

TABLE 4

| # | Cat 2 (in wt) | Polymer Yield (g) | C3 Convn (%) | Activity (kg/g/hr) | BD (g/cc) | MF (g/10 min) | Melting Point (°C.) 1st | Melting Point (°C.) 2nd | Mn ($10^{-3}$) | PDI (Mn/Mw) | $C_2$ (wt %) | Xsol wt % |
|---|---|---|---|---|---|---|---|---|---|---|---|---|
| 1 | 1:0 | 214 | 29 | 7.09 | c) | 38 | 106.0 | — | 66.1 | 2.2 | 6.0 | 6.28 |
| 2 | 4:1 | 161 | 22 | 8.05 | c) | 31 | 140.0 | — | 50.3 | 2.7 | 6.2 | 21.6 |
| 3 | 3:1 | 164 | 23 | 8.20 | c) | 35 | 140.4 | — | 63.4 | 2.3 | 6.4 | 24.5 |
| 4 | 2:1 | 141 | 20 | 7.05 | c) | 22 | 142.0 | 147.0 | 62.5 | 2.6 | 6.5 | 18.8 |
| 5 | 1:1 | 140 | 19 | 6.96 | 0.320$^{d)}$ | 23 | 144.4 | — | 61.1 | 3.0 | 6.1 | 21.1 |
| 6 | 1:2 | 172 | 24 | 8.56 | 0.395$^{d)}$ | 9.$^7$ | 146.4 | 139.2 | 73.8 | 3.2 | 4.3 | 9.2 |
| 7 | 1:3 | 165 | 23 | 8.21 | 0.412$^{d)}$ | 17 | 142.0 | — | 71.7 | 3.5 | 3.8 | 4.2 |
| 8 | 0:1 | 329 | 46 | 16.53 | 0.449$^{d)}$ | 6.$^3$ | 143.4 | — | 115.4 | 2.7 | 0.6 | 0.32 |

$^{a)}$Toluene used for deposition/cationization with the MAO-modified support formulation; Polymerization conditions: 20 mg supported catalyst, ca. 720 g propylene, 60 mg TEAL as scavenger in 2 L Autoclave Zipper reactor at 55° C. for 1 hr. The initial hydrogen concentration (before the catalyst was charged into the reactor) is 10 ppm.
$^{b)}$Calibrated mass flow is used for the ethylene delivery over one hour. The delivery pressure is 500 psig, and the in- and out-pressure difference is below 150 psig. The ethylene delivery rate is 333 mg/min.
$^{c)}$Chunky appearance due to the polymerization shut-down procedures and the stickiness of fluffs. All other runs were completed with improved propylene venting procedures.
$^{d)}$The fluff bulk density is not representative for the nascent one during the copolymerization primarily due to the fluff agglomeration during the workup.

Decrease of the initial hydrogen concentration in the copolymerization system gives low melt flow resin (see, Table 5).

TABLE 5

| # | Cat 2 (in wt) | Polymn Time (min) | Activity (kg/g/hr) | Melting Point (°C.) 1st | Melting Point (°C.) 2nd | Mn ($10^{-3}$) | PDI (Mn/Mw) | $C_2$ (wt %) | Xsol (wt %) | $C_2$ Cont (g) | $C_2$ Conv (%) | ΔHm (J/g) | −ΔHc (J/g) |
|---|---|---|---|---|---|---|---|---|---|---|---|---|---|
| 1 | 1:1 | 30 | 5.03 | 143.4 | — | 83.8 | 4.0 | 4.4 | 1.12 | 2.2 | 57.5 | 32.3 | 22.0 |
| 2 | 1:1 | 45 | 5.03 | 142.0 | — | 70.8 | 3.7 | 5.8 | 23.5 | 3.7 | 47.4 | 29.1 | 24.7 |
| 3 | 1:1 | 60 | 3.21 | 141.7 | — | 68.8 | 3.7 | 6.1 | 34.5 | 4.0 | 43.4 | 23.6 | 20.1 |
| 4 | 1:1$^{c)}$ | 60 | 6.30 | 137.7 | — | 101.3 | 3.4 | 5.2 | 15.0 | 6.6 | 59.2 | 45.9 | 32.8 |
| 5 | 1:1$^{d)}$ | 60 | 6.96 | 144.4 | — | 61.1 | 3.0 | 6.1 | 21.1 | 8.5 | 49.4 | 25.9 | 42.7 |

TABLE 5-continued

| Cat 2 # | Polymn Time (in wt) (min) | Activity (kg/g/hr) | Melting Point (° C.) 1st | 2nd | Mn ($10^{-3}$) | PDI (Mn/Mw) | $C_2$ (wt %) | Xsol (wt %) | $C_2$ Cont (g) | $C_2$ Conv (%) | ΔHm (J/g) | −ΔHc (J/g) |
|---|---|---|---|---|---|---|---|---|---|---|---|---|
| 6 | 2:1 | 60 | 4.73 | 140.4 | — | 61.6 | 2.8 | 7.0 | 47.8 | 6.7 | 27.7 | 8.7 | 33.3 |
| 7 | 2:1[d] | 60 | 7.05 | 142.0 | 147.0 | 62.5 | 2.6 | 6.5 | 18.8 | 9.2 | 45.8 | 64.2 | 45.8 |

[a]Toluene used for deposition/cationization with the MAO-modified support formulation; Polymerization conditions: 20 mg supported catalyst, ca. 720 g propylene, 60 mg TEAL as scavenger in 2 L Autoclave Zipper reactor at 55° C. No hydrogen was used for the polymerizations.
[b]Calibrated mass flow is used for the ethylene delivery over one hour. The delivery pressure is 500 psig, and the in- and out-pressure difference is below 150 psig. The ethylene delivery rate is 334 mg/min.
[c]The mixture of AR35 and 'm' catalysts in 1:1 weight ratio.
[d]Polymerizations with initial hydrogen concentration 10 ppm.

While the foregoing is directed to embodiments of the present invention, other and further embodiments of the invention may be devised without departing from the basic scope thereof and the scope thereof is determined by the claims that follow.

What is claimed is:

1. A propylene polymerization process comprising:
contacting propylene and an amount of ethylene with a first metallocene catalyst and a second metallocene catalyst within a polymerization reaction vessel to form a propylene based polymer, wherein the amount is an amount effective to form the propylene based polymer comprising from about 2 wt. % to about 0.6 wt. % ethylene, the second metallocene catalyst incorporates a greater amount of ethylene into the propylene based polymer than the first metallocene catalyst and wherein a propylene/ethylene random copolymer is provided in the presence of the first metallocene catalyst and exhibiting a melting temperature that is greater than that of a propylene/ethylene random copolymer formed from the second metallocene catalyst.

2. The process of claim 1, wherein the propylene based polymer exhibits a melt flow rate of from about 0.1 dg/min, to about 20 dg./min.

3. The process of claim 1, wherein the first metallocene catalyst and the second metallocene catalyst are supported on the same support material.

4. The process of claim 1, wherein the first metallocene catalyst is supported on a first support material and the second metallocene catalyst is supported on a second support material.

5. The process of claim 1, wherein the first metallocene catalyst contacts the second metallocene catalyst prior to introduction into the polymerization reaction vessel.

6. The process of claim 1, wherein the first metallocene catalyst and the second metallocene catalyst first contact one another within the polymerization reaction vessel.

7. The process of claim 1, wherein the first metallocene catalyst is represented by the general formula:

$$X(IndR^1R^2)_2MA_2;$$

wherein X is a structural bridge between Ind, Ind is an indenyl group, $R^1$ is a substituent on the $2^{nd}$ position and is an alkyl, $R^2$ is a substituent on the $4^{th}$ position and is a phenyl, M is a transition metal and A is an alkyl, hydrocarbyl or halogen group.

8. The process of claim 1, wherein the second metallocene catalyst is represented by the general formula:

$$X(IndR^1R^2)_2MA_2;$$

wherein X is a structural bridge between Ind, Ind is an indenyl group, $R^1$ is a substituent on the $2^{nd}$ position and is an alkyl, R2 is a benzo group at the 4,5 position, M is a transition metal and A is an alkyl, hydrocarbyl or halogen group.

9. The process of claim 1, wherein the first metallocene catalyst comprises dimethylsilylbis(2-methyl-4-phenyl-indenyl)zirconium dichloride.

10. The process of claim 1, wherein the second metallocene catalyst comprises dimethylsilylbis(2-methyl-4,5-benzo-indenyl)zirconium dichloride.

11. The process of claim 1, wherein the second metallocene catalyst is represented by the general formula:

$$XFlCpMA_2;$$

wherein X is a structural bridge between Fl and Cp, Fl is a fluorenyl group, Cp is a cyclopentadienyl group, M is a transition metal and A is an alkyl, hydrocarbyl or halogen group.

12. The process of claim 1, wherein the second metallocene catalyst comprises diphenylmethylene(2,7-di-tert-butyl-fluorenyl)(2-methyl-4-tert-butyl-cyclopentadienyl)zirconium dichloride.

13. The process of claim 1, wherein the second metallocene catalyst comprises dimethylmethylene(fluorenyl)(2-methyl-4-tert-butyl-cyclopentadienyl)zirconium dichloride.

14. The process of claim 1, wherein the first metallocene catalyst contacts the second metallocene catalyst in substantially equal amounts.

15. The process of claim 1, wherein the first metallocene catalyst contacts the second metallocene catalyst in a weight ratio of from about 10:1 to about 1:10.

16. The process of claim 1, wherein the first metallocene catalyst contacts the second metallocene catalyst in a weight ratio of from about 5:1 to about 1:5.

17. The process of claim 1, wherein the process exhibits an increased catalyst activity compared to an identical process absent the first metallocene catalyst.

* * * * *

UNITED STATES PATENT AND TRADEMARK OFFICE
CERTIFICATE OF CORRECTION

PATENT NO. : 8,278,403 B2
APPLICATION NO. : 12/832237
DATED : October 2, 2012
INVENTOR(S) : Tim Coffy et al.

It is certified that error appears in the above-identified patent and that said Letters Patent is hereby corrected as shown below:

In the Claims

Claim 1, column 21, line 27

"about 2 wt. % to about 0.6 wt. % ethylene"

should read

"about 2 wt. % to about 6 wt. % ethylene"

Signed and Sealed this
Twenty-fourth Day of June, 2014

Michelle K. Lee
*Deputy Director of the United States Patent and Trademark Office*